United States Patent [19]

Petersen et al.

[11] Patent Number: 4,543,457
[45] Date of Patent: Sep. 24, 1985

[54] MICROMINIATURE FORCE-SENSITIVE SWITCH

[75] Inventors: Kurt E. Petersen, San Jose; Henry V. Allen; James W. Knutti, both of Fremont, all of Calif.

[73] Assignee: Transensory Devices, Inc., Fremont, Calif.

[21] Appl. No.: 573,509

[22] Filed: Jan. 25, 1984

[51] Int. Cl.⁴ .............................................. H01H 35/34
[52] U.S. Cl. ............................... 200/83 N; 200/61.25; 200/61.45 R; 200/83 V; 307/117
[58] Field of Search .................... 200/83 N, 81.5, 81.4, 200/61.45 R, 83 V, 61.49; 307/117; 200/61.25

[56] References Cited

U.S. PATENT DOCUMENTS

| | | | |
|---|---|---|---|
| 2,594,676 | 4/1952 | Novak | 200/61.49 |
| 2,772,330 | 11/1956 | Higgins | 200/83 B |
| 2,780,693 | 8/1953 | McClellan | 200/86 R |
| 3,358,196 | 12/1967 | Steinmetz, Jr. et al. | 357/79 |
| 3,397,278 | 8/1968 | Pomerantz | 357/40 |
| 3,743,801 | 7/1973 | Brobeck et al. | 200/61.25 |
| 3,961,309 | 6/1976 | Eddy | 340/58 |
| 4,023,415 | 5/1977 | Garcia | 200/83 N X |
| 4,401,896 | 8/1983 | Fowler | 307/118 |

FOREIGN PATENT DOCUMENTS 2003325A 3/1979 United Kingdom ............. 200/83 N

OTHER PUBLICATIONS

K. E. Petersen, "Micromechanical Membrane Switches on Silicon", *IBM J. Res. Develop.*, vol. 23, No. 40, Jul. 1979, pp. 376–385.

George Wallis, et al., "Field Assisted Glass–Metal Sealing", *Journal of Applied Physics*, vol. 40, No. 10, Sep. 1969, pp. 3946–3949.

D. P. Fazzio, "Circular Sequencing Contact", *IBM Technical Disclosure Bulletin*, vol. 13, No. 1, Jun. 1970, p. 219.

Primary Examiner—Harry E. Moose, Jr.
Assistant Examiner—Morris Ginsburg
Attorney, Agent, or Firm—Fitch, Even, Tabin & Flannery

[57] ABSTRACT

A microminiature switch for digitizing different-valued external conditions, such as pressure, temperature of acceleration, is disclosed. The switch includes a silicon wafer having a deflectable, reduced-thickness membrane adapted to move from a relaxed position toward increasingly flexed or bulged positions in response to greater-value changes in such external condition. Movement of the membrane from its relaxed position to more strained positions establishes electrical contact between a common terminal and first one and then progressively more switch-state terminals in the switch, wherein the number of switch states which are closed corresponds to the external condition acting on the switch.

29 Claims, 10 Drawing Figures

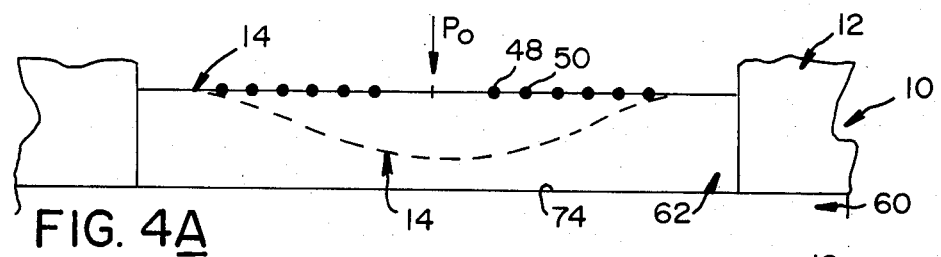
FIG. 4A
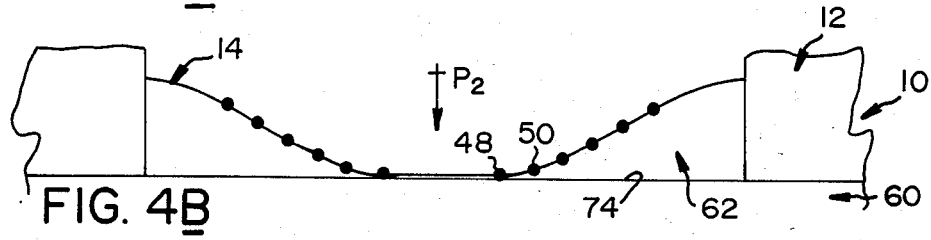
FIG. 4B
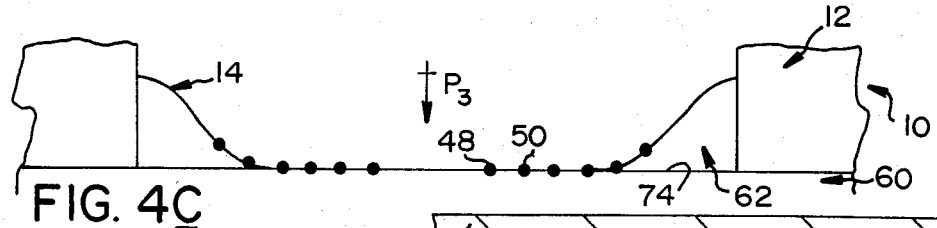
FIG. 4C
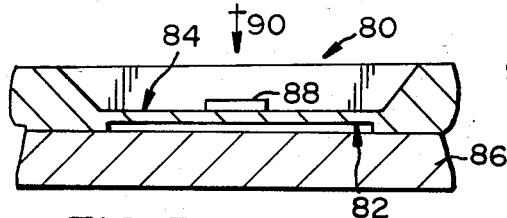
FIG. 5
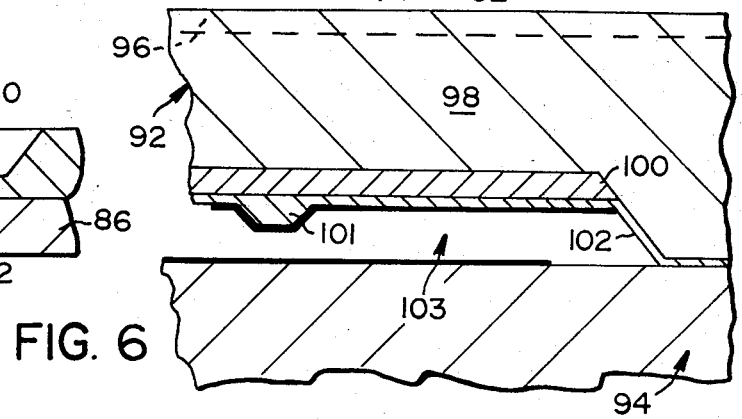
FIG. 6
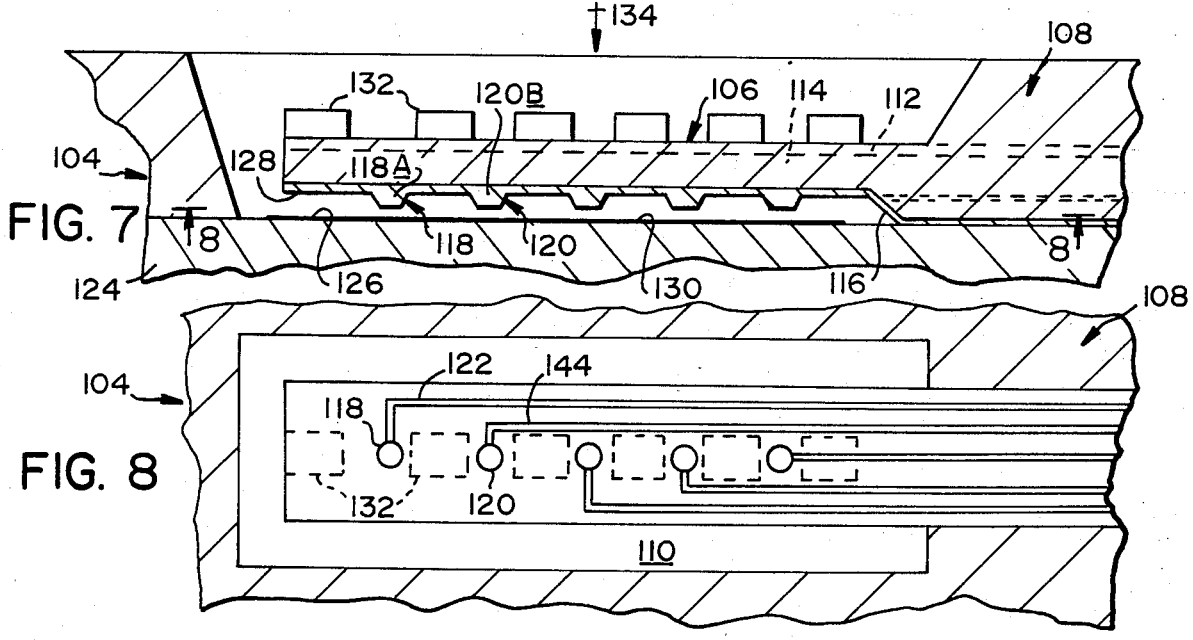
FIG. 7
FIG. 8

MICROMINIATURE FORCE-SENSITIVE SWITCH

BACKGROUND AND SUMMARY

The present invention relates to a microminiature, force-sensitive switch having a mechanical switching element formed in a silicon wafer.

The important electronic properties of silicon in integrated circuit technology are well established. More recently, the mechanical properties of silicon wafer components have been investigated. The inventor herein has previosly described the construction of an electrostatically deflectable silicon-beam device for use as an electrical switch or modulating element. Petersen, K. E., "Micromechanical Membrane Switches on Silicon", *IBM J. Res. Develop.*, Vol. 23 No. 4, pp. 376–385 (1979). The deflectable beam device described includes a thin (about 0.35 micron) silicon dioxide membrane coated with a conductive metal layer. The device functions as an active circuit element, in the sense that the switching function requires that a deflection voltage be applied. The device thus operates as an electrostatic version of an electromagnetic relay. Applications of silicon wafer mechanical devices to ink-jet nozzles and charge plates, a capillary gas chromatograph system, a miniature biomedical accelerometer, an optical bench for positioning fiber-optic components and lasers, and a microminiature Joule-Thompson cryogenic refrigerator have been described and are referred to in the above-cited paper.

Micromechanical devices formed in silicon wafers provide a number of advantages over other types of micromechanical elements, which are typically formed of metal membranes. Silicon membrane elements can be batch fabricated silicon intergrated circuit technology, and, as such, can be made to high accuracy and high reliability at relatively low cost. The fabrication techniques are readily adaptable to different design requirements. Silicon membranes also appear to be relatively fatigue-resistant. Initial studies on the operating behavior of micromechanical silicon elements, reported in the above-cited paper, indicate that continued flexing of the single crystal silicon elements is less likely to result in fatigue and breakage than in metal membranes.

The present invention addresses the need, in microminiature sensing systems, for a reliable, low-cost switch device capable of sensing, within a desired range, an external condition such as pressure, acceleration or temperature. The switch includes a silicon wafer having a reduced-thickness, deflectable membrane which is responsive to force-related changes in the external condition being measured. Movement of the membrane from a relaxed condition to more strained conditions establishes electrical contact between a common terminal and first one and then progressively more switch-state terminals in the switch, providing a digital measurement of the external condition acting on the switch, according to the number of switch states which are "closed" and "open". The switch may also function to monitor a selected threshold level of pressure, acceleration or temperature. The threshold level selected may be any one of several levels corresponding to one of the several switch states in the switch. Since the switch is a passive electrical element, wherein the switch state is determined solely by its response to an external condition, the switch can be used in a passive sensing system, such as a miniature accelerometer implanted within a body or a pressure sensing system located within a vehicle tire.

In a preferred switch construction, the silicon wafer is composed of a boron-doped silicon layer formed on a silicon substrate and having a silicon epitaxial layer formed over the boron-doped silicon layer, and the deflectable member is composed of the boron-doped silicon layer and a reduced-thickness portion of the epitaxial layer. The deflectable member is preferably between about 10 and 100 microns thick, and of between about 0.5 and 2 mm in length.

In one general embodiment, the deflection membrane takes the form of a diaphragm formed in a central region of a silicon wafer and adapted to bulge outwardly, from a central diaphragm region, in response to an increasing force-related external condition. The diaphragm-membrane switch may be constructed to include a fluid-tight chamber covering one side of the diaphragm, allowing the switch to respond to pressure differentials across the diaphragm. The diaphragm switch may also be used for measuring acceleration, by attaching a mass to the diaphragm, or for measuring temperature, by including in the diaphragm a metal layer having a substantially different thermal coefficient of expansion than that of the diaphragm's silicon layers.

In another general embodiment, the deflectable member takes the form of an elongated beam which may be either anchored at its opposite ends, for deflection from a central beam region, or at one end only, in cantilevel fashion, for deflection from its free end region. The beam-configuration switch may be used for digitizing or for monitoring a threshold temperature or acceleration level.

The invention further contemplates a passive, microminiature diaphragm switch having a reduced-thickness deflectable diaphragm, a stationary contact member, a pair of switch terminals, and electrical contacts associated with the confronting surfaces of the diaphragm and contact member for connecting the two switch terminals conductively when the diaphragm is moved from a relaxed to a preselected bulged condition, in response to a change in an external condition such as temperature, pressure or acceleration.

It is a general object of the present invention to provide a microminiature switch for use in digitizing or monitoring a threshold level of an external condition such as pressure, temperature or acceleration.

Another object of the invention is to provide such a switch which may be fabricated, using silicon-wafer fabrication techniques, to have a maximum switch response in a selected pressure, acceleration or temperature range.

Yet another object of the invention is to provide such a switch which operates as a passive circuit element.

A more specific object of the invention is to provide, for use in determining or detecting different-external pressure states, a passive microminiature switch containing a silicon diaphragm formed in a silicon wafer.

These and other objects and features of the present invention will become more fully apparent when the following detailed description of the invention is read in conjunction with the accompanying drawings.

BRIEF DESCRIPTION OF THE DRAWINGS

FIGS. 4A-4C illustrate movement of a deflectable diaphragm in the switch from a relaxed condition, shown in FIG. 4A, to progressively more strained conditions, shown in FIGS. 4B and 4C;

FIG. 5 is a fragmentary sectional view of a switch constructed according to a second embodiment of the invention, adapted for measuring the different acceleration forces applied to the switch in the direction of the arrow in the figure;

FIG. 6 is an enlarged, fragmentary sectional view of a switch constructed according to a third embodiment of the invention, adapted for sensing temperature changes in the switch;

FIG. 7 is a fragmentary sectional view of a switch constructed according to another general embodiment of the invention, having a deflectable elongate beam formed in a silicon wafer; and FIG. 8 is a top view of the beam in the switch shown in FIG. 7, viewed generally along line 8—8 in FIG. 7.

DETAILED DESCRIPTION OF THE INVENION

Figure 1:
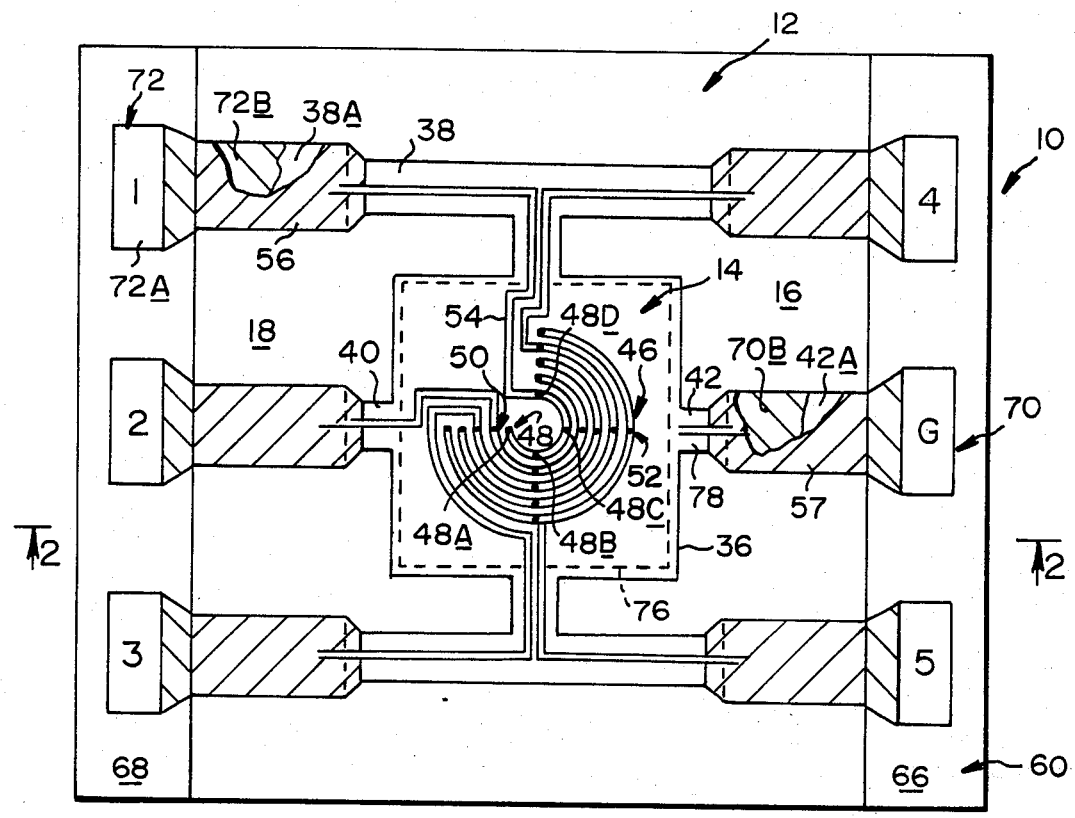
FIG. 1 is a plan, partially diagrammatic view of a multi-state, pressure-sensing switch constructed according to one embodiment of the invention.
Figure 2:
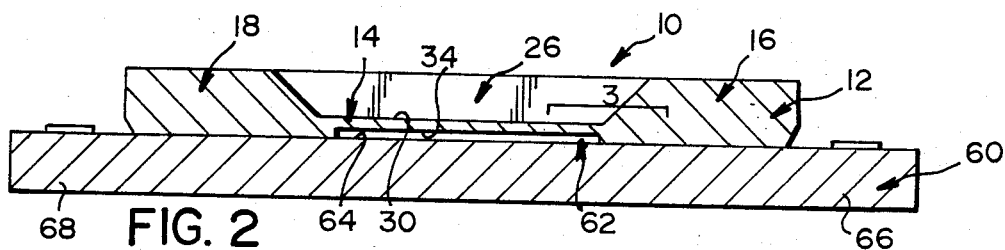
FIG. 2 is a sectional view of the switch, taken generally along line 2—2 in FIG. 1.
Figure 3:
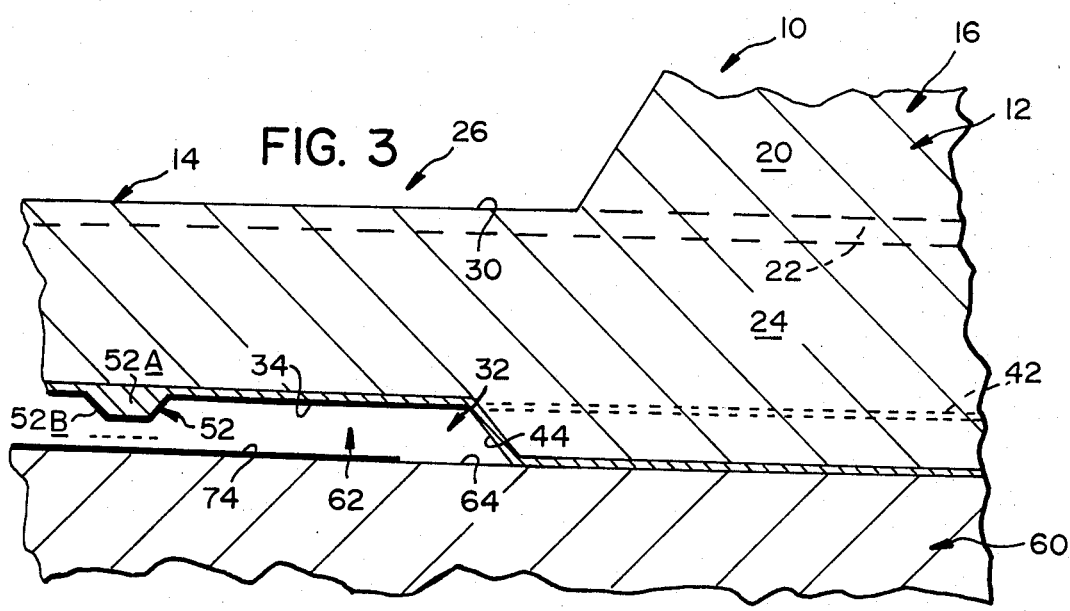
FIG. 3 is an enlarged, fragmentary sectional view of the switch, taken generally in the region indicated by bracket 3 in FIG. 2.

FIGS. 1-3 illustrate a microminiature, pressure-sensing switch 10 constructed according to one embodiment of the invention. With reference particularly to FIGS. 1 and 2, switch 10 includes a silicon substrate, or wafer 12 having a reduced-thickness, deflectable membrane, or diaphragm 14 formed in a central portion thereof. The diaphragm is integrally formed with and bordered by relatively thick side regions in the wafer, such as the opposed side regions 16, 18 seen in FIG. 2.

With reference to FIG. 3, which shows an enlarged fragmentary portion of the wafer, wafer 12 is composed of three layers: an outer silicon layer 20 having a typical thickness of about 200-500 microns, and intermediate boron-doped silicon layer 22 having a typical thickness of about 1-5 microns; and an inner epitaxial silicon layer 24 having a typical thickness of about 20 microns. The three-layered wafer is formed according to conventional methods. An approximately 1 mm² central portion of the wafer is removed by etching, through layer 20 and down to layer 22, forming an outer recess 26, whose planar interior surface forms the outer surface 30 of the diaphragm. A slightly smaller-area central portion of layer 24 is removed by etching to a depth of about 1 micron, to form an inner recess 32 whose planar interior surface forms the diaphragm's inner-surface 34. The roughly 1 mm² boundary defining the diaphragm's inner surface is shown in solid lines at 36 in FIG. 1.

According to an important feature of the present invention, the diaphragm has a relaxed, planar position or condition, shown in FIGS. 2 and 3, which the diaphragm assumes in the absence of a net external force across the membrane, and is adapted to move from this relaxed condition toward increasingly strained conditions, or positions, upon the application an increasingly greater net force across the diaphragm. Where, as in the present switch, the diaphragm is adapted to respond to a pressure differential across the membrane, produced by the pressure of an external fluid acting against the diaphragm's outer surface, the diaphragm bulges inwardly (in a downward direction in FIGS. 2 and 3), initially from a central diaphragm region and spreading outwardly toward the sides of the diaphragm as greater pressure is applied and the diaphragm is moved toward a more strained condition. This pressure-responsive bulging is achieved, in a diaphragm having the layer composition described above, with a preferred diaphragm thickness of between about 10 and 100 microns and a preferred side-to-side dimension of between about 0.5 and 2 mm.

With reference to FIGS. 1-3, recess 32 formed in the central portion of layer 24 communicates with a network of wiring channels, such as channels 38, 40 and 42 extending to the left or right side regions of the wafer surface, as shown. Each channel, such as channel 38, terminates adjacent the associated side of the wafer, in an enlargement, such as enlargements 38A, 42A which defines a feedthrough region of the switch, whose purpose will be described below. The inner surface of the wafer, excluding the surfaces of the wafer's side regions, are coated with a thin silicon dioxide insulating layer 44 seen in FIG. 3. This layer is typically about 0.2 microns thick.

With continued reference to FIGS. 1-3, there is formed on layer 44, in the central region of the diaphragm, a cross-like array 46 of contacts which are represented in the drawing as small circles. As seen, the array includes 20 such contacts composed of five groups, such as groups 48, 50, each group including four contacts, such contacts 48A-48D in group 48, arranged at 90° intervals concentrically about the center of the diaphragm. The construction of contact 52 in array 46 is typical and will be described with reference to FIG. 3. As seen here, the contact includes a button 52A formed integrally with insulative layer 44, and having the generally truncated conical shape shown. The button, extends typically about 0.5 microns from the surrounding planar region of surface 44, and has a typical average diameter of about 10 microns. (FIG. 3, like the other side sectional views in the drawings, illustrates the invention in exaggerated vertical scale). Button 52A is coated with a layer 52B of an electrically conductive metal, which is preferably one like aluminum or gold, which can be applied by vapor deposition.

Returning to FIG. 1, each group of contacts, such as group 48, is connected by a conductive metal strip, such as strip 54, joined to each contact in that group and routed across the diaphragm membrane to an associated channel, such as channel 38, through which the strip is routed to the enlargement of the distal end of the channel. Each enlargement in the wafer has formed therein a layer of a feedthrough conductor, such as conductors 56, 57, in enlargements 38A, 42A, respectively. The conductors in the six enlargements in the wafer are used in forming hermetically sealed feedthrough electrical contacts in the switch, in a manner to be described below. Each of the strips in the wafer, such as strip 54, is connected to an associated feedthrough conductor, such as conductor 56, as indicated. The metallic layer forming the contacts, strips and feedthrough conductors on the wafer are preferably formed in a single vapor deposition step.

Switch 10 also includes a glass plate 60 which is hermetically sealed to the wafer, in a manner to be described, to form a fluid-tight chamber 62 covering the inner surface of the diaphragm. The surface portion of the plate confronting diaphragm surface 34 is indicated at 64 in FIGS. 2 and 3. The plate may be etched, at regions corresponding to the four corners of wafer recess 32, to form compartments (not shown) which communicate with and thus form part of the fluid-tight chamber. These compartments, by increasing the total contained volume in the chamber, minimize internal pressure changes within the chamber during switch operation. Plate 60, which is preferably a Pyrex glass wafer having a thickness of about 500 microns is also referred to herein as a stationary contact member.

Left and right side portions of the glass plate in FIGS. 1 and 2 extend beyond the sides of the wafer as shown, providing a pair of shelves 66, 68 on which electrical terminals in the switch are located. As seen in FIG. 1, the switch terminals include a ground, or common terminal 70, and a plurality of switch-state terminals, such as terminal 72, which are identified as terminals 1-5 in the figure.

Describing terminal 72, which is representative, such includes a rectangular pad 72A and a feedthrough conductor 72B extending through the above-mentioned feedthrough area, at which layer 72B overlaps and forms a hermetically sealed contact with conductor 56 on the wafer.

The switch contacts carried in the inner surface of the wafer diaphragm are adapted to make contact, during switch operation, with a conductive expanse 74 (FIG. 3) carried on the plate's inner surface 64 and having the approximate planar dimensions shown in dotted lines 76 in FIG. 1. The conductive expanse is connected directly to terminal 70 by a metallic strip 78 connecting the expanse to a feedthrough conductor 70B forming part of terminal 70. The conductive expanse, terminals, and strip 78 on the glass plate are preferably formed in a single metal vapor deposition step, with the terminal pads being formed by a thicker deposition layer to facilitate wire-bonding of the switch to an external surface.

In the assembled switch, the feedthrough conductors associated with the five groups of electrical contacts, such as conductor 56 in enlargement 38A are electrically connected to the associated terminal, such as terminal 72, by a pressed bonding connection between the two overlapping conductors. The overlapping conductors in the feedthrough regions, and the associated strips, such as strip 54, thus provide means connecting each contact, or group of contacts, such as group 48, conductively to a corresponding switch-state terminal, such as terminal 72. Expanse 74 is directly connected to terminal 70 through strip 78. Conductor 70B in terminal 70 overlaps and is sealed in the associated feedthrough region with conductor 57 formed on the wafer, as shown to seal the feedthrough region of terminal 70. The conductive expanse and strip 78 connecting the expanse to terminal 70 are also referred to herein, collectively, as conductor means. The conductor means associated with the plate surface, the plurality of spaced electrical contacts associated with the diaphragm surface are and their connections to associated switch-state terminals also referred to herein, collectively, as electrical contact means.

In the construction of switch 10, a wafer of the type described is treated to produce an approximately 0.3 micron thick silicon dioxide surface coating. The epitaxial layer is etched, using conventional photoresist silicon fabrication methods, to produce the diaphragm recess and associated channels, to a depth of about 1 micron. The oxide layer is removed and the etched wafer is treated again to form a silicon dioxide layer of about 0.5 microns. The epitaxial layer is re-etched, along its side region, to form grooves in the epitaxial layer which will allow the wafer to be fractured along what will become the sides of the wafer in the completed switch. The oxide layer is completely etched off of the wafer everywhere except the contact buttons, which then extend above the recessed wafer's surface about 0.5 microns. The wafer is re-oxidized to form a silicon dioxide coating of about 0.15 microns. This oxide layer is etched to provide contact regions where the glass plate will touch the bare silicon when the wafer is bonded to the glass plate. There is then deposited on the epitaxial layer surface a metal layer about 0.15 microns thick to form the metal coatings on the contact buttons, the five strips associated with the five groups of contacts, and the conductors in the channel enlargements adjacent the sides of the wafer.

A Pyrex glass plate, approximately 500 microns thick, may be etched in the above mentioned pattern of four squares in the regions corresponding to the corners of the diaphragm, to provide additional switch chamber volume. A metal layer about 0.15 microns is deposited on the glass to form expanse 74, associated strip 78, and the six switch terminals.

The wafer and glass plate are aligned and bonded together hermetically to seal the region between the diaphragm and plate. The preferred method used for bonding the glass plate to the silicon substrate is the technique known as "anodic bonding", or "Mallory bonding", described, e.g., in U.S. Pat. No. 3,397,278 and in Wallis and Pomerantz "Field-assisted Glass-Metal Sealing", J. Appl. Phys., Vol. 40 p. 3946 (1969). This type of bonding involves mating an optically flat insulator substrate, such as Pyrex glass, to a corresponding flat surface of a silicon substrate. It has been found that the best anodic bonding occurs with Corning No. 7740 Pyrex glass, a glass substrate that has thermal expansion characteristics closely matching that of silicon. It is important to have matching thermal expansion characteristics to avoid temperature-related stresses in the bond that may lead to early failure of the bond seal.

The overlapping feedthrough conductors are bonded together to form a hermetic seal across the glass/silicon wafer boundary in each feedthrough region of the switch. A preferred method of bonding the overlapping conductors in a switch feedthrough region is described in U.S. Pat. Application Ser. No. 573,508 for "Method and Apparatus for Forming Hermetically Sealed Electrical Feedthrough Conductors", filed Jan. 24, 1984, and assigned to the assignee of the present application.

The operation of switch 10 will be described with reference to FIGS. 4A-4C, which illustrate electrical contact portions of the switch diagrammatically. FIG. 4A shows the inner surface of diaphragm 14 in a relaxed condition (solid line) which occurs when the external pressure, $P_O$, acting on the outer surface of the diaphragm is roughly equal to the pressure within the switch chamber 62. Increasing the external pressure slightly to $P_1$ causes the central region of the diaphragm to bulge inwardly, as indicated by dashed lines in FIG. 4A.

At a higher pressure $P_2$, further bulging of the diaphragm, illustrated in FIG. 4B, initially brings the contacts in group 48—those closest to the center of the diaphragm—and then the contacts in adjacent group 50, against conductive expanse 74, initially closing switch-state terminal no. 1 and then terminal no. 2.

FIG. 4C illustrates the condition of the switch at a still greater pressure $P_3$. Here the diaphragm is moved to a strained condition in which the first four groups of electrical contacts on the diaphragm are brought against the conductive expanse on the glass plate, progressively closing switch-state terminals no. 3 and no. 4. At a still greater pressure level, the diaphragm is deflected to a more strained condition (not shown) which will close switch-state terminal no. 5.

It is noted that the "cross-sectional" diaphragm movement illustrated in FIGS. 4A-4C occurs symmetrically with respect to the four sides of the diaphragm, acting at each switching level to bring another group of four contacts against the plate expanse. The arrangement of four contacts in each group acts to guide the progressive deformation of the diaphragm symmetrically, as it bulges progressively more outwardly and is flattened in its central region by contact with the plate, as can be appreciated from the three figures. The four contacts in each group also provide a contact redundancy, at each switch level, to offset any loss of individual contact function due to the possible wearing away of the relatively thin coating on the contact surface.

It can be seen from the above discussion how switch 10 functions to digitize different-valued external pressures, such as $P_2$–$P_3$. Thus, at a subthreshold pressure, e.g., $P_0$, or $P_1$, each of the five switch-state terminals will be in an "open" state, and at an increasing pressure levels, first switch-state terminal 1 and then progressively terminals 2-5 will be switched from "open" to "closed" states.

Alternatively, the switch may be used as a simple on/off switching element in a system designed to respond to an indicated pressure change above or below a selected pressure threshold. One such system is a tire pressure monitoring system for a vehicle tire (not shown). The system includes an internal "responder" unit, including switch 10, located within the vehicle tire, and an external "detector" unit located outside and adjacent the tire. The detector unit is designed to respond, for example, by electromagnetic coupling, to the switch state of the responder unit within the tire, to alert the vehicle user to any drop in the vehicle tire below a threshold level. Because switch 10 operates as a passive circuit element in the system, the internal unit does not need any power.

The switch in a pressure-sensing system of this type is initially calibrated to respond to a selected threshold pressure by determining which of the five switch state terminals is closed as the threshold pressure level is reached. Preferably, the threshold pressure is one which switches one of the intermediate switch-state terminals, such as terminals 2-4, assuring that the threshold level is located in the most pressure-responsive range of the switch. The pressure-sensing system is then constructed to operate in response to changes in the switch state occurring at that terminal. Other terminals in the switch may also be included in the system circuitry, to provide additional information as to the extent of deviation of the measured pressure from the selected threshold pressure. One advantage of the multi-state switch in a system of this type is that the system can be readily adjusted to respond to different pressure thresholds. Another advantage is that variations in the pressure-sensing characteristics of a switch, which are related to manufacturing variations, can be adjusted for.

FIG. 5 illustrates, in fragmentary cross-sectional view, a microminiature multi-state switch 80 constructed according to a second embodiment of the invention. The switch is designed to respond to changes in acceleration forces to which the switch is subjected. The construction of switch 80 is substantially identical to that of above-described switch 10, with the following exceptions: (1) An internal chamber 82 in the switch, formed between a diaphragm 84 and glass plate 86, need not be fluid-tight; and (2) one or more mass elements, such as mass element 88, are attached to the outer surface of diaphragm. The one or more mass elements are constructed and arranged on the diaphragm to produce increased bulging of the diaphragm, symmetrically with respect to the diaphragm's center region, in response to an increased acceleration force acting on the mass element(s) in the direction of arrow 90 in the figure. The increased bulging results in progressively more of the contacts (not shown) carried on the diaphragm to close first one and then progressively more of the plural switch-state terminals in the switch (also not shown).

The switch can be used in an acceleration measuring system, such as a biomedical accelerometer, for digitizing different-valued acceleration forces acting on the switch, or for monitoring a threshold acceleration value, analogous to the uses of switch 10 described above.

FIG. 6 illustrates an enlarged cross-sectional fragmentary view of a portion of a diaphragm 92 microminiature temperature sensing-switch 94 constructed according to another embodiment of the invention. The diaphragm is composed of an outer boron-doped layer 96, an adjacent reduced-thickness epitaxial layer 98, a metal layer 100, and an inner insulative layer 102 on which contact buttons, such button 101 are formed. Layers 96, 98 and 102 are like the corresponding layers forming diaphragm 14 in switch 10. Layer 100 includes an approximately 2-10 micron thick film of a suitable metal, such as gold or aluminum, which is preferably deposited by vapor deposition on layer 98. While metal is a preferred material in layer 100, other suitable flexible materials whose coefficient of thermal expansion differs substantially from that of combined silicon layers 96, 98 might also be used. Inner layer 102 can be formed on layer 100 by conventional silicon wafer application techniques, such as sputtering. The design and construction of switch 94 are otherwise substantially as described with reference to switch 10, except that the chamber formed between the diaphragm and the switch contact plate, indicated at 103, need not be fluid tight.

In operation, diaphragm 92 has a relaxed condition at a selected lower temperature, at which the switch-state terminals in the switch are "open". As the temperature to which the diaphragm is exposed increases, the relatively greater thermal expansion in the metal layer draws the diaphragm inwardly, producing bulging in the diaphragm's central region. As the temperature increases, such bulging brings first one group of contacts and then progressively more outwardly spaced groups of contacts against the above-mentioned plate, to close progressively more of the switch-state terminals in the switch. Analogous to switches 10 and 86 described above, the temperature sensing diaphragm switch may be used in a temperature-sensing system either to digitize different-value temperatures, or to monitor a selected threshold temperature.

The three switches described above have in common a reduced-thickness diaphragm formed in a silicon wafer. In another general embodiment, the switch membrane takes the form of a reduced-thickness beam which is deflectable from a relaxed to more strained conditions, in response to changes in an external condition, such as temperature or acceleration. The beam may be formed integrally with, and anchored to, opposite side regions of the wafer, with deflection occurring from a central beam region progressively outwardly toward the opposed sides of the wafer as the beam is moved toward more strained condition. Alternatively, the beam may have a cantilever construction in which force-related beam occurs from the beam's free end. The latter type of beam construction will be described below with reference to FIGS. 7 and 8.

FIGS. 7 and 8 illustrate fragmentary portions of a switch 104 having a cantilever-beam membrane 106 formed in a silicon wafer 108. As seen in FIG. 8, the beam extends into and partially fills the upper portion of a rectangular cavity 110 which extends through the wafer in a top-to-bottom direction in the figure. The beam is composed of an outer boron-doped layer 112, a reduced-thickness epitaxial layer 114, and an inner silicon dioxide layer 116, each layer having a thickness comparable to that of the corresponding layer in above-described diaphragm 14. The beam may be formed by an etching procedure similar to the one used in forming diaphragm 14, where the boron-doped layer is undoped in the U-shaped region corresponding to cavity 110 allowing etching through layers 112 and 114 in this region.

A row of five electrical contacts, such as contacts 118, 120, carried on the inner surface of the beam are formed by coating insulative buttons, such as buttons 118A, 120B, formed with and protruding from layer 116. The contacts are connected to five corresponding switch-state terminals (not shown) in the switch by strips, such as metallic strips 122, 144 seen in FIG. 8. The metal coating of the wafer to form the contacts, strips and attachments to the corresponding terminals is similar to that already described with reference to switch 10.

A glass plate 124 (FIG. 7) in the switch defines the inner surface 126 which confronts the beam inner surface 128, shown in FIG. 7. A conductive expanse 130 carried on surface 126 is connected to a common terminal (not shown) in the switch in a manner similar to that described in switch 10.

The beam switch just described may be constructed either for temperature or acceleration sensing. The embodiment illustrated here includes a series of mass elements, such as elements 132, which make the beam responsive to changes in acceleration in the direction of arrow 134 in FIG. 7. In a temperature-sensing switch, the beam would be constructed to include a metallic layer, similar to layer 100 in switch 94, FIG. 6 which causes beam flexing in response to temperature changes.

In operation, an acceleration force acting on the mass elements in the beam causes initial deflection from a relaxed condition, shown in FIG. 7, toward a strained condition in which the beam's free end begins to flex inwardly toward the switch plate. As the acceleration force is increased, the beam is moved to increasingly more strained conditions in which more aproximal regions of the beam are bent inwardly, bringing first one and then progressively more of the beam contacts against expanse 130. Thus, as the beam is moved from its relaxed toward more strained conditions, in response to an increasingly greater acceleration force applied to the elements, the beam functions to connect the common terminal first to one and then progressively more of the switch-state terminals.

Like above-described switches 80 and 94, the elongate-beam switch of the invention may be used either to digitize changes in an external condition, such as acceleration or temperature, acting on the switch or to monitor a threshold level of such condition.

From the foregoing, it can be appreciated how various objects of the invention are met. The multi-state feature of the switch allows its use in a microminiature system designed either for digitizing or monitoring the threshold level of an external condition, such as pressure, temperature or acceleration. The design of the switch can be readily adapted, by conventional silicon wafer fabrication techniques, to respond to a selected range of external conditions, and where the switch is used for monitoring a threshold level, one of a number of different threshold levels may be selected and the variations in the response characteristics of a switch due to manufacturing variations can be adjusted for.

The construction of the switching and electrical contact components of the switch by conventional silicon-wafer fabrication techniques allows for low cost, high accuracy switch manufacture and design flexibility. Silicon micromechanical switch components also appear to have advantageous fatigue resistance properties, as indicated above. The reliability of the switch, over an extended operation period, is enhance by the redundancy of switch contacts in the diaphragm-membrane embodiments of the invention.

Finally, the fact that the switch operates as a passive circuit element makes it suitable for a miniature sensing system having a responder unit which is not internally powered, such as a pressure-sensing responder unit described herein or a body-implantable responder unit.

While various embodiments of the invention have been described herein, it will be appreciated that various changes and modifications may be made without departing from the spirit of the invention.

What is claimed is:

1. A microminiature, force-sensitive, multi-state switch comprising
   a silicon wafer having a reduced-thickness, deflectable membrane adapted to move from a relaxed condition toward increasingly strained conditions upon the application of an increasingly greater force to the membrane,
   a stationary contact member disposed adjacent and spaced from the membrane, with the latter in its relaxed condition, said membrane and contact member forming a pair of confronting surfaces,
   a common terminal,
   a plurality of switch-state terminals, and
   electrical contact means associated with said confronting surfaces for connecting the common terminal first to one and then progressively to more of the switch-state terminals upon movement of the membrane toward increasingly strained conditions.

2. The switch of claim 1, wherein said electrical contact means includes a plurality of spaced electrical contacts carried on one of the confronting surfaces, means connecting each contact conductively to a corresponding switch-state terminal, and conductor means carried on the other of said confronting surfaces, adapted to connect said common terminal to said contacts progressively upon such membrane movement.

3. The switch of claim 2, wherein said conductor means includes a conductive expanse carried on the surface of said other confronting surface, and means connecting said expanse to said common terminal.

4. The switch of claim 3, wherein said contacts are carried on the surface of the membrane, and said expanse is carried on the surface of said stationary contact member.

5. The switch of claim 1, wherein said membrane includes a diaphragm adapted to move to increasingly bulged positions upon the application of a force to one side of the diaphragm.

6. The switch of claim 5, for use in sensing the pressure of an external fluid, which further includes means forming a fluid-tight chamber covering the other side of said diaphragm.

7. The switch of claim 6, wherein said stationary contact member includes a plate which is sealed to side regions of said wafer which surround the diaphragm, to form said chamber.

8. The switch of claim 1, wherein said membrane extends between, and is formed integrally with, opposite side regions of said wafer, and the application of force to said membrane is adapted to produce membrane bulging which spreads outwardly from the membrane's central region as the membrane becomes more strained.

9. The switch of claim 8, wherein said electrical contact means includes a plurality of groups of electrical contacts, where each group including a pair of contacts carried on the surface of the membrane, substantially symmetrically with respect to the central region thereof, and the groups are arranged in progressively more outwardly disposed pairs, and means connecting each group of contacts to a corresponding switch-state terminal.

10. The switch of claim 9, wherein the membrane includes a diaphragm adapted, upon the application of force thereto, to form a central bulge which spreads increasingly outwardly, substantially symmetrically in all directions, upon application of an increased force to the diaphragm, and each group of electrical contacts includes a multiplicity of contacts arrayed symmetrically with respect to such force-produced bulging.

11. The switch of claim 1, wherein said silicon wafer includes a boron-doped silicon layer sandwiched between a silicon layer and a silicon epitaxial layer, and said membrane is composed of the boron-doped silicon layer and a reduced-thickness portion of the epitaxial layer.

12. The switch of claim 11, wherein said membrane includes a diaphragm having a thickness of between about 10 and 50 microns, and a side-to-side dimension of between about 0.5 to 2 millimeters.

13. A microminiature switch for digitizing or monitoring changes in an external condition, such as pressure, temperature or acceleration, said switch comprising
a silicon wafer having a reduced-thickness deflectable membrane adapted to move between a relaxed condition and a continuum of increasingly strained conditions in response to greater-value changes in such external condition,
a stationary contact member disposed adjacent and spaced from the deflectable membrane, with the latter in its relaxed condition, said membrane and said contacting member defining a pair of confronting surfaces,
a common terminal,
a plurality of switch-state terminals,
a plurality of spaced electrical contacts carried on one of said surfaces,
means connecting each contact conductively to a corresponding switch-state terminal, and
conductor means carried on the other of said surfaces, adapted to connect said common terminal first to one, then progressively to more of said switch-state contacts upon movement of the membrane from its relaxed condition toward increasingly strained conditions.

14. The switch of claim 13, wherein said membrane includes a diaphragm whose increasingly strained conditions take the form of increased bulging in the diaphragm outwardly from a central region thereof.

15. The switch of claim 14, for use in digitizing or monitoring changes in the pressure of an external fluid in contact with one side of the diaphragm, which further includes means forming a fluid-tight chamber covering the other side of the diaphragm.

16. The switch of claim 14, for use in digitizing or monitoring changes in acceleration force, which further includes a mass attached to the diaphragm to effect such bulging in response to changes in an acceleration force in the direction of bulging.

17. The switch of claim 14, for use in digitizing or monitoring changes in temperature, wherein said membrane includes a metal layer formed on a reduced-thickness silicon layer.

18. The switch of claim 13, wherein said membrane includes an elongate beam having opposed fixed and free end regions, and which is adapted to contact the stationary contact member at its free end region initially and progressively more toward its fixed end region upon movement toward increasingly strained conditions.

19. The switch of claim 18, for use in digitizing or monitoring changes in switch acceleration forces, which further includes a series of mass elements carried on the beam's free end region.

20. The switch of claim 18, for use in digitizing or monitoring changes in temperature, wherein the beam is composed of a metal layer formed on a reduced-thickness silicon layer.

21. A microminiature switch for digitizing or monitoring changes in an external pressure, comprising
a silicon wafer having a flexible, reduced-thickness diaphragm adapted to move from a relaxed condition toward increasingly bulged conditions upon the application of a pressure-related force to one side of the said diaghram,
a contact plate disposed adjacent and spaced from the other side of the diaphragm, and sealed to side regions of the wafer bordering the diaphragm, to form a fluid-tight chamber covering said other side of the diaphragm, the diaphragm and the plate defining a pair of confronting surfaces within said chamber,
a common terminal,
a plurality of switch-state terminals,
a plurality of spaced electrical contacts carried on one of said confronting surfaces,
means connecting each contact conductively to a corresponding switch-state terminal, and
conductor means carried on the other confronting surfaces, adapted to connect said common terminal first to one and then progressively to more of the switch-state terminals upon movement of the diaphragm toward increasingly strained conditions.

22. The switch of claim 21, wherein the conductor means includes a conductive expanse carried on said other confronting surface, and means connecting said expanse to the common terminal.

23. The switch of claim 22, wherein the contacts are carried on the confronting surface of the diaphragm, and the conducting expanse is carried on the confronting surface of said contact plate.

24. The switch of claim 21, wherein the diaphragm is adpated to bulge symmetrically from a central bulge region outwardly upon the application of a greater pressure-related force, said contacts include a plurality of groups of contacts, the contacts in each group are arranged substantially symmetrically with respect to the center of the diaphragm, and said connecting means includes means connecting the contacts in each group to the corresponding switch-state terminal.

25. The switch of claim 23, wherein each group of contacts includes a multiplicity of contacts arrayed symmetrically about the center of the diaphragm.

26. A passive, microminiature diaphragm switch comprising
a silicon wafer having a reduced-thickness, deflectable diaphragm adapted to move from a relaxed condition toward increasing bulged conditions upon the application of an increasingly greater force to the diaphragm,
a stationary contact member disposed adjacent and spaced from the diaphragm, with the latter in its relaxed condition, the diaphragm and contact member defining a pair of confronting surfaces,
a pair of switch terminals, and
electrical contact means associated with said confronting surfaces for connecting said pair of switch terminals conductively when the diaphragm is moved from its relaxed condition to a preselected bulged condition.

27. The switch of claim 26, which is responsive to a selected change in fluid pressure applied to one side of the diaphragm, wherein the stationary contact member is sealed to edge regions of the wafer bordering the diaphragm to form a fluid-tight chamber covering the other side of the diaphragm.

28. The switch of claim 26, wherein the silicon wafer includes a boron-doped silicon layer sandwiched between a silicon layer and a silicon epitaxial layer, and the diaphragm includes the boron-doped silicon layer and a reduced-thickness portion of the epitaxial layer.

29. The switch of claim 28, wherein the diaphragm has a thickness of between about 10 and 50 microns and a side-to-side dimension of between about 0.5 and 2 millimeters.

* * * * *